(12) United States Patent
Nishii

(10) Patent No.: US 11,661,854 B2
(45) Date of Patent: May 30, 2023

(54) STATOR VANE SEGMENT OF AXIAL TURBINE

(71) Applicant: IHI CORPORATION, Tokyo (JP)

(72) Inventor: Daisuke Nishii, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 17/443,262

(22) Filed: Jul. 23, 2021

(65) Prior Publication Data

US 2022/0098993 A1  Mar. 31, 2022

Related U.S. Application Data

(63) Continuation of application No. PCT/JP2019/048296, filed on Dec. 10, 2019.

(30) Foreign Application Priority Data

Mar. 26, 2019 (JP) .............................. JP2019-058879

(51) Int. Cl.
   *F01D 9/02* (2006.01)

(52) U.S. Cl.
   CPC ............ *F01D 9/02* (2013.01); *F05D 2220/32* (2013.01); *F05D 2240/12* (2013.01)

(58) Field of Classification Search
   CPC ... F01D 9/02; F01D 5/14; F01D 5/141; F01D 5/041; F05D 2220/32; F05D 2240/12
   See application file for complete search history.

(56) References Cited

U.S. PATENT DOCUMENTS 4,826,400 A * 5/1989 Gregory .................. F01D 5/141
                                                          415/181
6,299,412 B1  10/2001 Wood et al.
(Continued)

FOREIGN PATENT DOCUMENTS

DE  10 2010 014 556 A1  10/2011
EP       0 441 097 A1   8/1991
(Continued)

OTHER PUBLICATIONS

International Search Report dated Feb. 10, 2020 in PCT/JP2019/048296 filed on Dec. 12, 2019, 2 pages.
(Continued)

*Primary Examiner* — Courtney D Heinle
*Assistant Examiner* — Andrew Thanh Bui
(74) *Attorney, Agent, or Firm* — Oblon, McClelland, Maier & Neustadt, L.L.P.

(57) ABSTRACT

A stator vane segment includes: a plurality of airfoil portions; and one outer band and one inner band joined to a tip portion and a hub portion of each airfoil portion. Each airfoil portion is formed by stacking airfoil profiles in a spanwise direction from the hub portion to the tip portion. Each profile includes a leading edge, a trailing edge, a pressure surface, and a suction surface, in a stacking line connecting respective trailing edges of the profiles at spanwise positions. A portion from the tip portion to a predetermined position is a straight line in a radial direction. A portion from the predetermined position to the hub portion is shifted from the pressure surface toward the suction surface in a circumferential direction from the straight line parallel to the radial direction. An amount of the shift monotonically increases from the predetermined position to the hub portion.

8 Claims, 5 Drawing Sheets

(56) References Cited

U.S. PATENT DOCUMENTS

| | | |
|---|---|---|
| 6,331,100 B1 | 12/2001 | Liu et al. |
| 6,554,564 B1 | 4/2003 | Lord |
| 7,118,330 B2* | 10/2006 | Tsuru .................. F01D 5/16 |
| | | 416/243 |
| 2003/0215325 A1* | 11/2003 | Tsuchiya ............ F01D 5/141 |
| | | 415/119 |
| 2007/0231122 A1 | 10/2007 | Tsuru et al. |
| 2008/0063520 A1 | 3/2008 | Baumann et al. |
| 2008/0152501 A1 | 6/2008 | Greim et al. |
| 2014/0245741 A1 | 9/2014 | He et al. |
| 2015/0110604 A1 | 4/2015 | Calza et al. |
| 2016/0194962 A1* | 7/2016 | Cojande ............. F01D 5/141 |
| | | 415/208.1 |
| 2017/0211421 A1 | 7/2017 | Takamura |
| 2019/0264568 A1* | 8/2019 | Kislinger ........... F01D 9/047 |

FOREIGN PATENT DOCUMENTS

| | | |
|---|---|---|
| JP | 62-170707 A | 7/1987 |
| JP | 10-131707 A | 5/1998 |
| JP | 2001-193692 A | 7/2001 |
| JP | 2001-221195 A | 8/2001 |
| JP | 3423850 B2 | 7/2003 |
| JP | 2008-545097 A | 12/2008 |
| JP | 4474989 B2 | 6/2010 |
| JP | 2015-520321 A | 7/2015 |
| JP | 2016-035249 A | 3/2016 |

OTHER PUBLICATIONS

Extended European Search Report dated Nov. 15, 2022 in European Patent Application No. 19921773.8, 6 pages.

\* cited by examiner

STATOR VANE SEGMENT OF AXIAL TURBINE

TECHNICAL FIELD

The present disclosure relates to a stator vane segment of an axial turbine.

BACKGROUND ART

For example, a gas turbine engine such as a turbofan engine includes a compressor, a combustor, and a turbine as main components.

Among these, the turbine is a turbo machine that has a function of converting thermal energy of combustion gas generated by the combustor into rotational energy. There are types of turbines such as an axial flow type and a radial flow type. In a gas turbine engine, an axial flow type turbine (axial turbine) is often adopted, and this axial turbine will be described below.

The axial turbine includes one or more stages arrayed in the axial direction, and each stage is composed of a stator vane row disposed on the upstream side and a rotor blade row disposed on the downstream side.

Among these, the stator vane row is usually formed from a plurality of stator vane segments arranged side by side in the circumferential direction, and each stator vane segment includes an airfoil portion, and an outer band and an inner band joined to a tip portion (radially outer end) and a hub portion (radially inner end) of each airfoil portion, respectively. Each airfoil portion further includes a leading edge and a trailing edge, and a concave pressure surface and a convex suction surface each extending between the leading edge and the trailing edge.

The stator vane segment is cantilevered by a casing through fixing of the outer band to an inner circumference of the substantially cylindrical casing. The outer band and the inner band each have such a shape as to form a ring as a whole in a state in which all the stator vane segments composing the stator vane row are attached to the casing. At this time, a radially inner surface of the outer band and a radially outer surface of the inner band form radially inner and outer boundary surfaces of a combustion gas flow path, respectively.

The stator vane segment may be formed in a mode (single vane) in which only one airfoil portion is provided between the outer band and the inner band, or may be formed in a mode (coupled vane) in which a plurality of airfoil portions are provided between the outer band and the inner band. For example, Patent Document 1 discloses a stator vane segment having three airfoil portions between an outer band and an inner band.

RELATED ART DOCUMENT

Patent Document

Patent Document 1: Japanese Patent No. 4474989

SUMMARY OF THE DISCLOSURE

Problems to be Solved by the Disclosure

As described above, the stator vane segment formed as a coupled vane is also cantilevered by the casing through fixing of the outer band to the inner circumference of the casing, and therefore deformation of the outer band is restrained, while the inner band is in a state of being freely deformable.

During operation of a turbine (gas turbine engine), the radially outer surface of the inner band is exposed to the flow of combustion gas, while the radially inner surface of the inner band is in contact with the air of a significantly lower temperature than the combustion gas (generally, air extracted from the compressor composing the gas turbine engine).

As a result, the radially outer side of the inner band is largely thermally expanded in the circumferential direction as compared with the radially inner side, and therefore the inner band is deformed in such a manner that the curvature of the inner band is increased as compared with a normal temperature state. As a result of this deformation, the airfoil portion disposed at the circumferential end of the inner band, of the airfoil portions constituting the stator vane segment formed as a coupled vane, is pulled relatively largely inward in the radial direction. In particular, in the airfoil portion whose suction surface is located on the circumferential end side of the inner band, high stress is generated on the suction surface near the hub portion.

As a measure to reduce this stress, it is conceivable to increase the thickness of the airfoil portion, but this results in deterioration of aerodynamic performance of the airfoil portion. Further, increase in the thickness of the airfoil portion leads to increase in weight, and therefore cannot be said to be a preferable measure in the stator vane segment applied to an aircraft turbofan engine in which weight reduction is strictly required.

An object of the present disclosure, which has been made in view of the above problems, is to provide a stator vane segment of an axial turbine formed as a coupled vane, the stator vane segment being capable of reducing stress generated on a suction surface near a hub portion of an airfoil portion having a suction surface located on a circumferential end side of an inner band without causing increase in weight.

Means for Solving the Problems

In order to solve the aforementioned problem, a stator vane segment of an axial turbine of the present disclosure includes: a plurality of airfoil portions; one outer band joined to a tip portion of each of the plurality of airfoil portions and one inner band joined to a hub portion of each of the plurality of airfoil portions, wherein each of the plurality of airfoil portions is formed by stacking airfoil profiles in a spanwise direction from the hub portion to the tip portion, and each of the profiles includes a leading edge and a trailing edge, and a concave pressure surface and a convex suction surface each extending between the leading edge and the trailing edge, in a stacking line obtained by connecting the respective trailing edges of the profiles at spanwise positions, a portion from the tip portion to a predetermined spanwise position is a straight line parallel to a radial direction of the axial turbine, a portion from the predetermined spanwise position to the hub portion is shifted from the pressure surface toward the suction surface in a circumferential direction of the turbine from the straight line parallel to the radial direction, and an amount of the shift monotonically increases from the predetermined spanwise position to the hub portion.

Effects of the Disclosure

According to a stator vane segment of an axial turbine of the present disclosure, it is possible to obtain an excellent effect that it is possible to reduce stress generated on a suction surface near a hub portion of an airfoil portion having the suction surface located on a circumferential end side of an inner band without causing increase in weight.

MODE FOR CARRYING OUT THE DISCLOSURE

Hereinafter, an embodiment of the present disclosure will be described in detail with reference to the drawings.

Figure 1A:
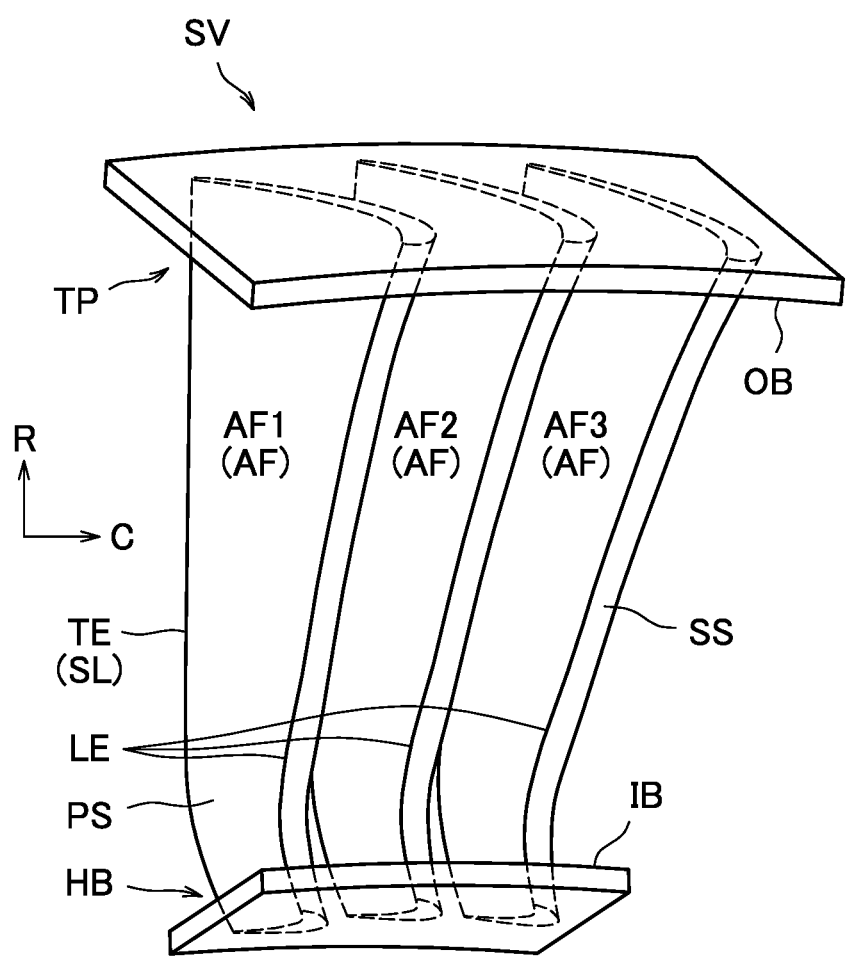
FIG. 1A is a schematic perspective view of a stator vane segment of an embodiment of the present disclosure as viewed from a front side.

FIGS. 1A and 1D are schematic perspective views of a stator vane segment of the embodiment of the present disclosure as viewed from the front side and the rear side, respectively.

Figure 1B:
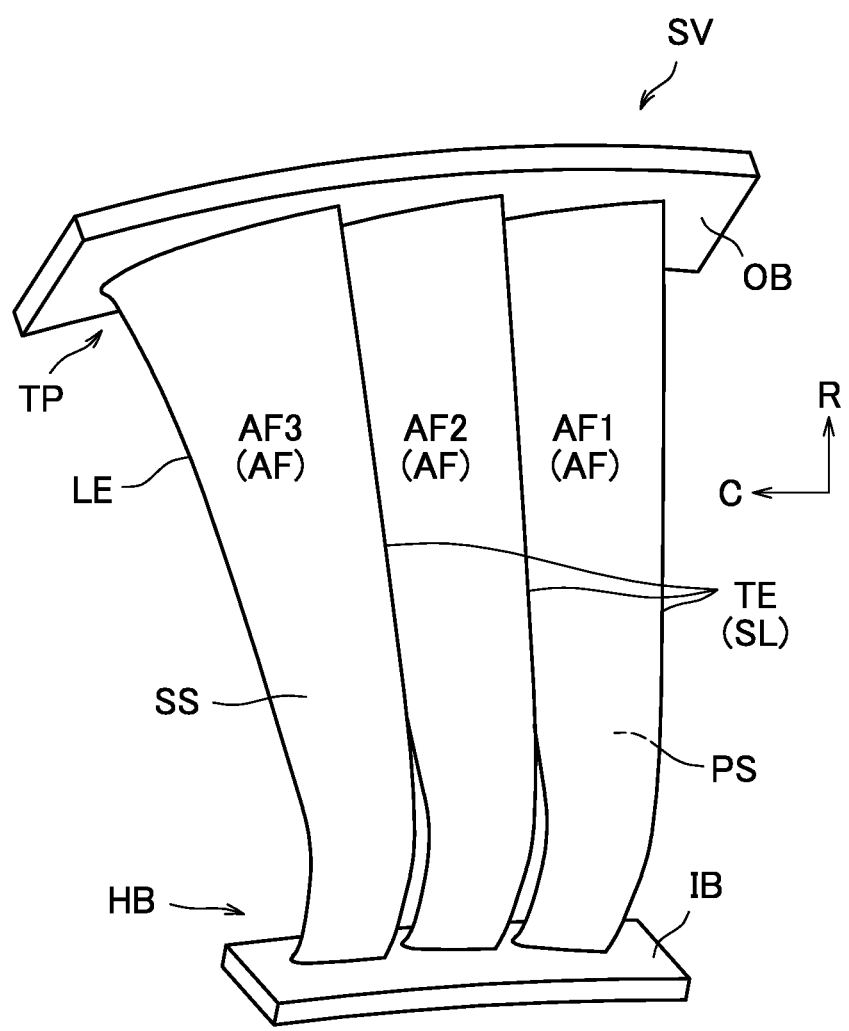
FIG. 1B is a schematic perspective view of the stator vane segment of the embodiment of the present disclosure as viewed from a rear side.

As illustrated in FIGS. 1A and 1B, a stator vane segment SV of the embodiment of the present disclosure includes three airfoil portions AF, and an outer band OB and an inner band IB joined to respective tip portions TP (outer end portions in the radial direction R) and hub portions HB (inner end portions in the radial direction R) of the airfoil portions AF, respectively.

Each airfoil portion AF includes a leading edge LE and a trailing edge TE, and a concave pressure surface PS and a convex suction surface SS each extending between the leading edge LE and the trailing edge TE.

Herein, of the three airfoil portions AF, one whose pressure surface PS is located on the second end side in the circumferential direction C of the stator vane segment SV is referred to as a first airfoil portion AF1, and one whose suction surface SS is located on the first end side in the circumferential direction C of the stator vane segment SV is referred to as a third airfoil portion AF3, and one disposed between the first airfoil portion AF1 and the third airfoil portion AF3 is referred to as a second airfoil portion AF2.

The airfoil portions AF (AF1 to AF3) are each formed by stacking airfoil cross sections (profiles) perpendicular to the radial direction R in the spanwise direction from the hub portion HB to the tip portion TP (this is referred to as stacking).

The stacking mode is defined by the shape of a line connecting representative points of the profiles at spanwise positions (this is referred to as a stacking line), and in the stator vane segment SV, the trailing edge of each profile is adopted as this representative point. Therefore, the stacking line SL of each airfoil portion AF (AF1 to AF3) of the stator vane segment SV coincides with the corresponding trailing edge TE.

As illustrated in FIGS. 1A and 1B, the stacking line SL of each airfoil portion AF of the stator vane segment SV, that is, the trailing edge TE is a straight line parallel to the radial direction R up to a predetermined spanwise position (hereinafter referred to as a shift start position X) from the tip portion TP toward the hub portion HB, but a portion from the shift start position X (see FIG. 2) to the hub portion HB (that is, in a region near the hub portion HB) is shifted in the circumferential direction C in the direction from the pressure surface PS toward the suction surface SS (to the right in FIG. 1A, and to the left in FIG. 1B).

Figure 2:
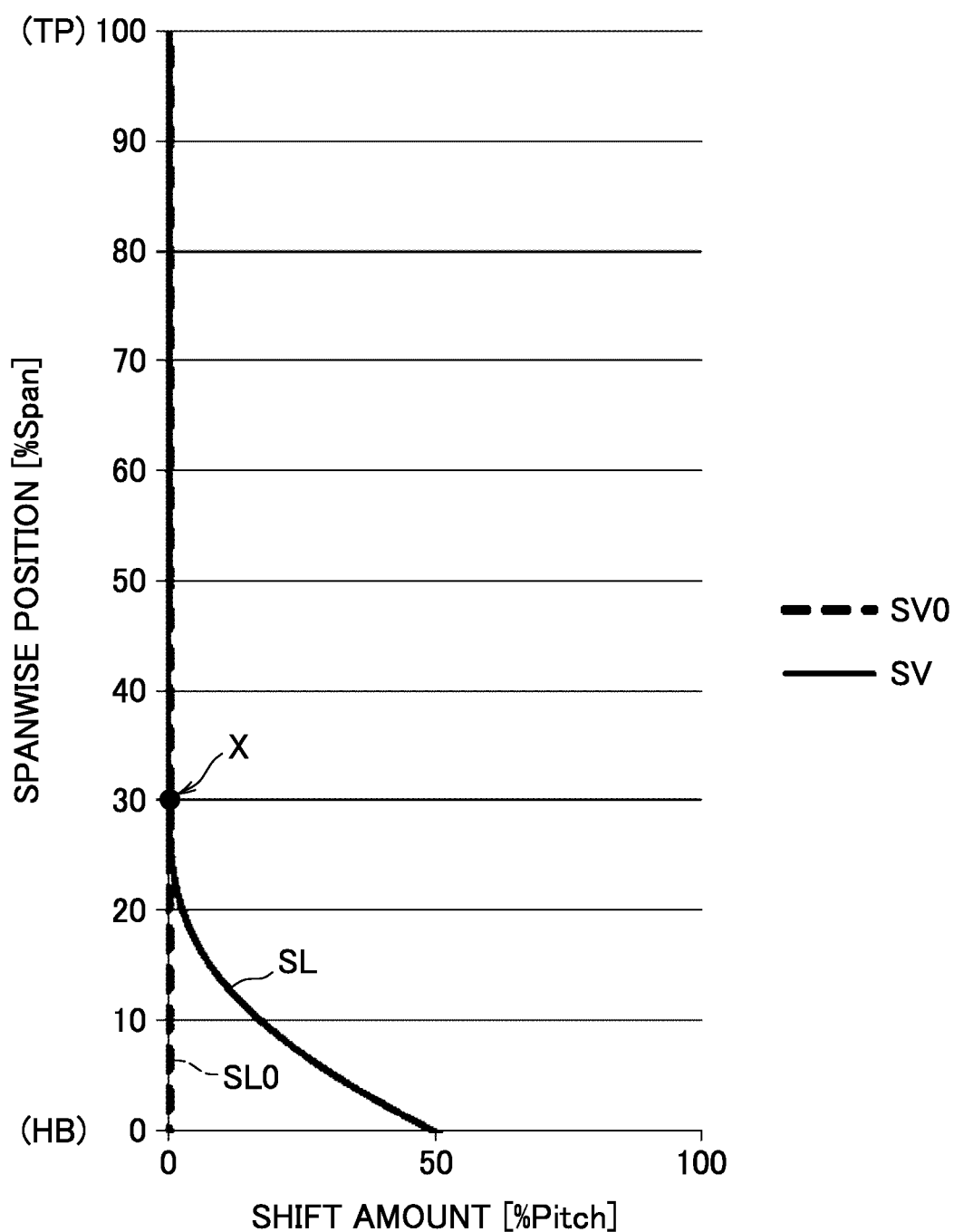
FIG. 2 is a graph illustrating the shape of a stacking line of an airfoil portion of the stator vane segment according to the embodiment of the present disclosure.

FIG. 2 is a graph illustrating a shape of the stacking line SL of each airfoil portion AF (AF1 to AF3) of the stator vane segment SV of the embodiment of the present disclosure. Herein, the vertical axis of the graph illustrates the spanwise position, and the horizontal axis illustrates a shift amount in the circumferential direction C (direction from the pressure surface PS toward the suction surface SS) of the stacking line SL.

The spanwise position plotted on the vertical axis is the percentage (% Span) of a dimensionless value obtained by dividing the height measured from the hub portion HB of each airfoil portion AF by the total height of each airfoil portion AF (height from the hub portion HB to the tip portion TP; Span), and 0% Span and 100% Span correspond to the hub portion HB and the chip TP portion, respectively. The shift amount plotted on the horizontal axis is the percentage (% Pitch) of a dimensionless value obtained by division by a circumferential interval in the hub portion HB of each airfoil portion AF, that is, a Pitch.

In a conventional stator vane segment SV0, the shift amount of the stacking line SL0 in the circumferential direction C is zero (0% Pitch) over the entire region in the spanwise direction from the tip portion TP (100% Span) to the hub portion HB (0% Span) (see broken line in FIG. 2).

On the other hand, in the stator vane segment SV of the embodiment of the present disclosure, the shift amount of the stacking line SL in the circumferential direction C is zero (0% Pitch) in a portion up to 30% Span from the tip portion TP (100% Span) toward the hub portion HB, but increases monotonically from 0% Pitch to 50% Pitch in a portion from 30% Span toward the hub portion HB (0% Span) (see the solid line in FIG. 2).

That is, in this embodiment, the shift start position X is 30% Span, and the maximum shift amount (shift amount at the hub portion HB) is 50% Pitch. However, the shift start position X can be appropriately selected within a range of 10 to 50% Span, and the maximum shift amount can be appropriately selected within a range of 10 to 100% Pitch.

In the graph of FIG. 2, a curved line representing change in the shift amount from the shift start position X to the hub portion HB is a curved line without an elbow (that is, a smooth curve) connected to a straight line from the tip portion TP to the shift start position X smoothly (that is, in such a manner as to share a tangent line) at the shift start position X, and can be, for example, a quadratic curve.

Figure 3:
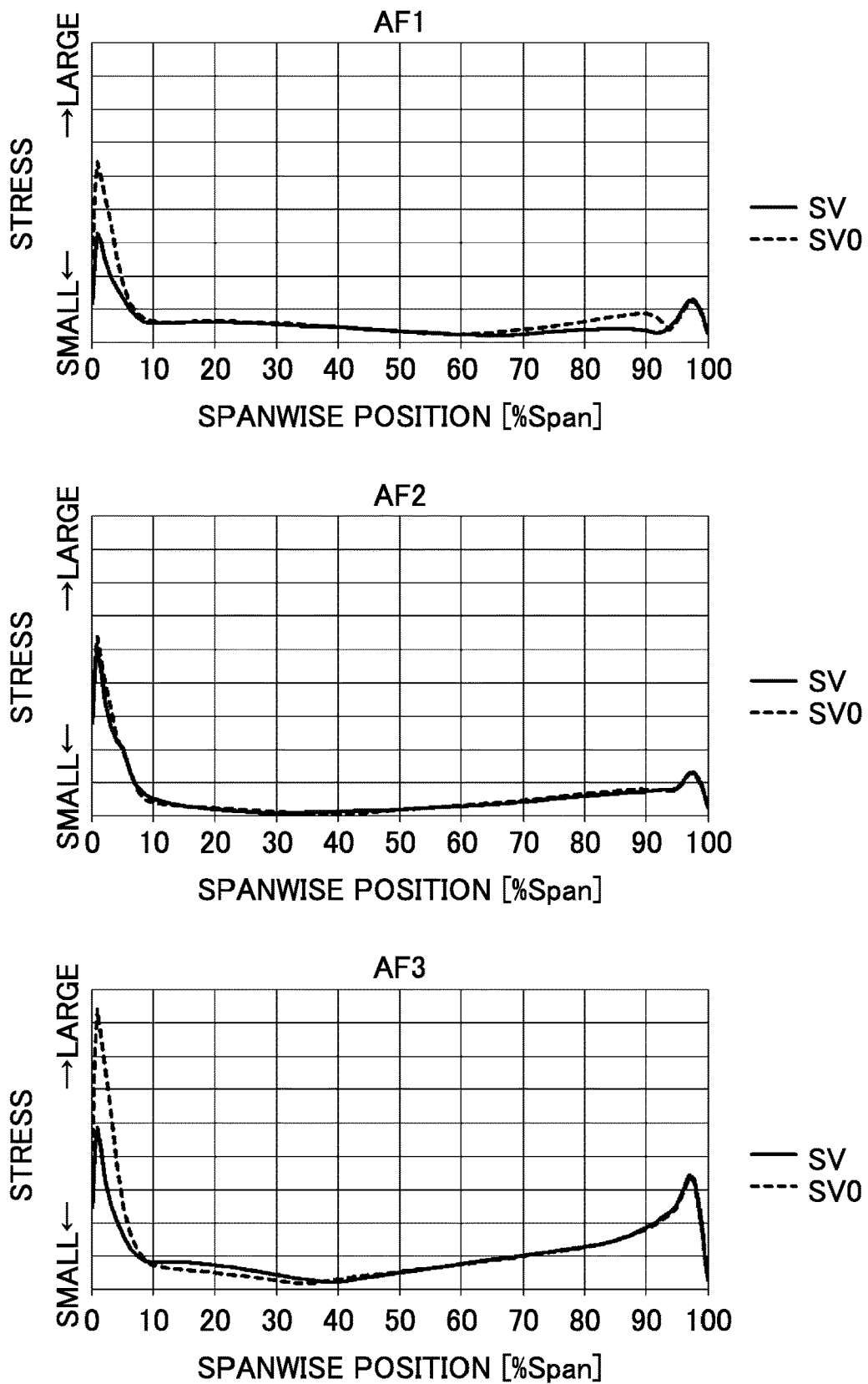
FIG. 3 is a graph illustrating a result of an obtained spanwise distribution of stress generated on a suction surface of each airfoil portion of the stator vane segment of the embodiment of the present disclosure in an operating state of a turbine.

FIG. 3 illustrates a result of an obtained spanwise distribution of stress generated on the suction surface SS of each airfoil portion AF (AF1 to AF3) in an operating state of a turbine (gas turbine engine), in the stator vane segment SV formed in described above. For comparison, each graph also illustrates a spanwise distribution of stress in the conventional stator vane segment SV0.

As is clear from FIG. 3, in the stator vane segment SV of the embodiment of the present disclosure, in any of the first airfoil portion AF1 to the third airfoil portion AF3, stress generated in the region near the hub portion HB (0% Span) is lower than that of the conventional stator vane segment SV0.

Figure 4:
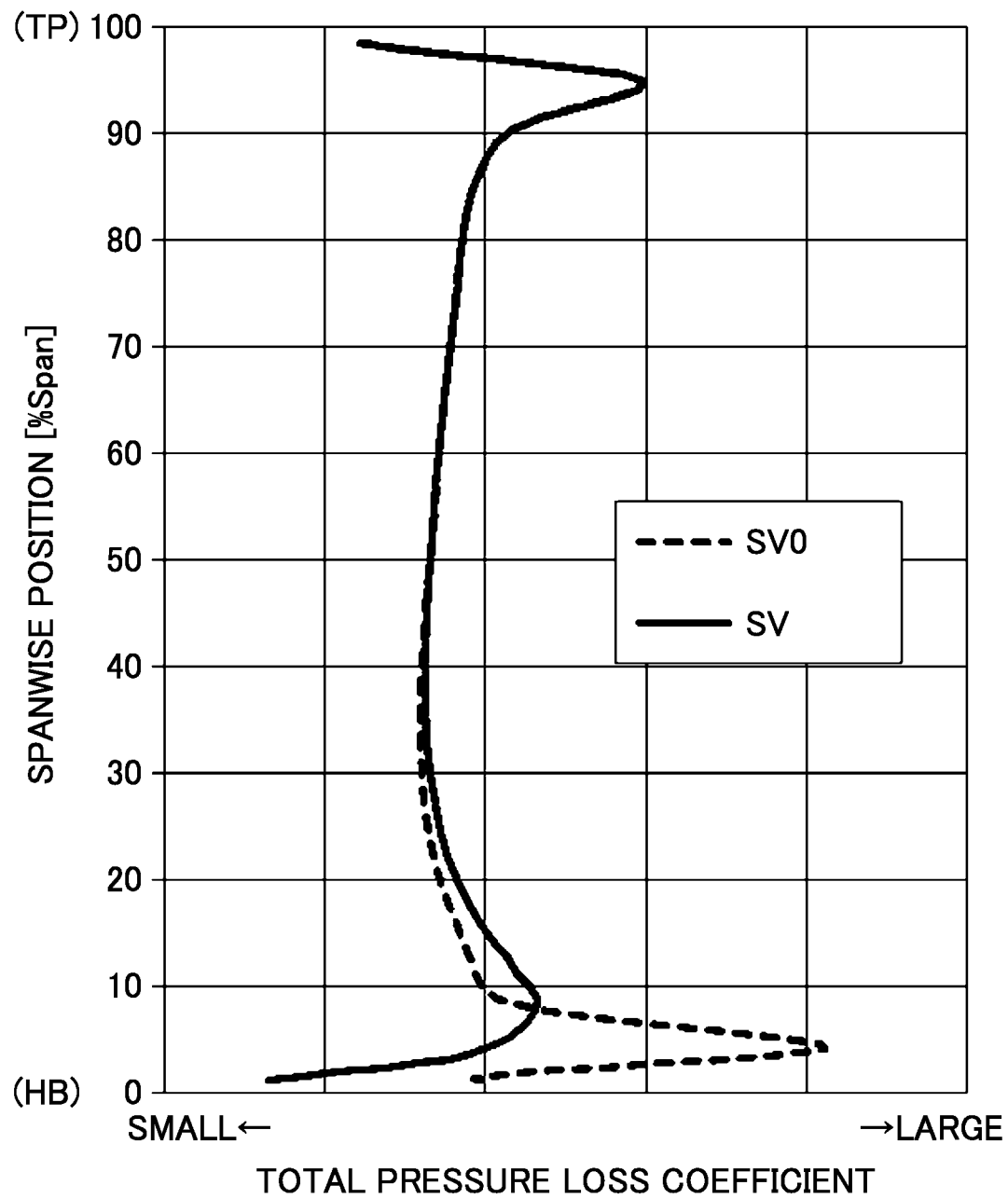
FIG. 4 is a graph illustrating a result of an obtained spanwise distribution of a total pressure loss coefficient of the stator vane segment of the embodiment of the present disclosure.

As to the stator vane segment SV of the embodiment of the present disclosure, CFD (Computational Fluid Dynamics; numerical fluid dynamics) analysis is performed, and a result of an obtained spanwise distribution of a total pressure loss coefficient is illustrated in FIG. 4.

As is clear from FIG. 4, in the stator vane segment SV of the embodiment of the present disclosure, a peak of the total pressure loss coefficient due to secondary flow in the region near the hub portion HB (0% Span) is smaller than that of the conventional stator vane segment SV0. It is considered that this is because the stacking line SL is shifted in the circumferential direction C in the region near the hub portion HB, so that the secondary flow is suppressed.

As described above, in the stator vane segment SV of the embodiment of the present disclosure, the stress generated on the suction surface SS in the region near the hub portion HB can be reduced as compared to the conventional stator vane segment SV0, and it is possible to obtain an excellent effect that the total pressure loss due to the secondary flow in the above region can be suppressed to a low level. Moreover, this effect is obtained only by deformation of the stacking line SL (shift in the circumferential direction C in the region near the hub portion HB), and does not cause increase in weight.

As illustrated in FIG. 3, the effect of the reduction in the stress generated on the suction surface SS in the region near the hub portion HB is large in the airfoil portions AF (the first airfoil portion AF1 and the third airfoil portion AF3) disposed at the ends of the stator vane segment SV in the circumferential direction C, and is the largest in the third airfoil portion AF3 having the suction surface SS located on the end side in the circumferential direction C of the stator vane segment SV.

Based on this, the shape of the stacking line SL applied to all the airfoil portions AF in the aforementioned stator vane segment SV may be applied only to the third airfoil portion AF3 where a particularly large stress reduction effect can be obtained. Alternatively, the maximum shift amounts that are the same for all airfoil portions AF in the aforementioned stator vane segment SV may be changed such that the maximum shift amount in the third airfoil portion AF3 that can obtain a particularly large stress reduction effect is made larger than other airfoil portions (the first airfoil portion AF1 and the second airfoil portion AF2). In any case, the pitch in the hub portion HB of the airfoil portion AF becomes non-uniform in the circumferential direction C, but care should be taken such that a throat area does not change as a whole of the stator vane row formed by the stator vane segment SV. Consequently, it is possible to avoid an adverse effect on aerodynamic performance.

In the above, the case where the stator vane segment SV includes the three airfoil portions AF is described, but the number N of the airfoil portions AF included in the stator vane segment SV may be 4 or more. Also in this case, the shift in the circumferential direction C in the region near the hub portion HB of the stacking line SL may be applied only to an N-th airfoil portion AFN having a suction surface SS located on one of the end sides in the circumferential direction C of the stator vane segment SV, or the maximum shift amount of the N-th airfoil portion AFN may be made larger than those of other airfoil portions.

Aspects of Present Disclosure

A stator vane segment of an axial turbine of a first aspect of the present disclosure includes: a plurality of airfoil portions; one outer band joined to a tip portion of each of the plurality of airfoil portions; and one inner band joined to a hub portion of each of the plurality of airfoil portions, wherein each of the plurality of airfoil portions is formed by stacking airfoil profiles in a spanwise direction from the hub portion to the tip portion, and each of the profiles includes a leading edge and a trailing edge, and a concave pressure surface and a convex suction surface each extending between the leading edge and the trailing edge, in a stacking line obtained by connecting the respective trailing edges of the profiles at spanwise positions, a portion from the tip portion to a predetermined spanwise position is a straight line parallel to a radial direction of the axial turbine, a portion from the predetermined spanwise position to the hub portion is shifted from the pressure surface toward the suction surface in a circumferential direction of the turbine from the straight line parallel to the radial direction, and an amount of the shift monotonically increases from the predetermined spanwise position to the hub portion.

According to a stator vane segment of an axial turbine of a second aspect of the present disclosure, when the spanwise position is indicated by a percentage of a dimensionless value obtained by dividing a height measured from the hub portion by a total height of each of the airfoil portions, the predetermined spanwise position is 10 to 50%.

According to a stator vane segment of an axial turbine of a third aspect of the present disclosure, when the amount of the shift is indicated by a percentage of a dimensionless value obtained by division by a circumferential interval in the hub portion of each of the airfoil portions, the amount of the shift in the hub portion is 0 to 100%.

EXPLANATION OF REFERENCE SIGNS

SV stator vane segment
AF airfoil portion
HB hub portion
TP tip portion
LE leading edge
TE trailing edge
PS pressure surface
SS suction surface
SL stacking line
OB outer band
IB inner band
X shift start position (predetermined spanwise position)
R radial direction
C circumferential direction

The invention claimed is:
1. A stator vane segment of an axial turbine, the stator vane segment comprising:
three or more airfoil portions;
one outer band joined to a tip portion of each of the airfoil portions; and
one inner band joined to a hub portion of each of the airfoil portions, wherein
each of the airfoil portions is formed by stacking airfoil profiles in a spanwise direction from the hub portion to the tip portion, and each of the profiles includes a leading edge and a trailing edge, and a concave pressure surface and a convex suction surface each extending between the leading edge and the trailing edge, in a stacking line obtained by connecting the respective trailing edges of the profiles at spanwise positions, a portion from the tip portion to a predetermined spanwise position is a straight line parallel to a radial direction of the axial turbine, a portion from the predetermined spanwise position to the hub portion is shifted from the pressure surface toward the suction surface in a circumferential direction of the turbine from the straight line parallel to the radial direction, and an amount of the shift monotonically increases from the predetermined spanwise position to the hub portion, and the amount of the shift in the hub portion of the airfoil portion having the suction surface located on an end side in the circumferential direction of the stator vane segment, of the three or more airfoil portions, is larger than the amounts of the shift in the hub portions of other airfoil portions of the three or more airfoil portions.

2. The stator vane segment according to claim 1, wherein when the spanwise position is indicated by a percentage of a dimensionless value obtained by dividing a height measured from the hub portion by a total height of each of the airfoil portions, the predetermined spanwise position is 10 to 50%.

3. The stator vane segment according to claim 1, wherein when the amount of the shift is indicated by a percentage of a dimensionless value obtained by division by a circumferential interval in the hub portion of each of the airfoil portions, the amount of the shift in the hub portion is 10 to 100%.

4. The stator vane segment according to claim 2, wherein when the amount of the shift is indicated by a percentage of a dimensionless value obtained by division by a circumferential interval in the hub portion of each of the airfoil portions, the amount of the shift in the hub portion is 10 to 100%.

5. A stator vane segment of an axial turbine, the stator vane segment comprising:
three or more airfoil portions;
one outer band joined to a tip portion of each of the airfoil portions; and
one inner band joined to a hub portion of each of the airfoil portions, wherein each of the airfoil portions is formed by stacking airfoil profiles in a spanwise direction from the hub portion to the tip portion, and each of the profiles includes a leading edge and a trailing edge, and a concave pressure surface and a convex suction surface each extending between the leading edge and the trailing edge, in a stacking line obtained by connecting the respective trailing edges of the profiles at spanwise positions, a portion from the tip portion to a predetermined spanwise position of each of three or more airfoil portions is a straight line parallel to a radial direction of the axial turbine, a portion from the predetermined spanwise position to the hub portion of only the airfoil portion having the suction surface located on an end side in a circumferential direction of the turbine of the stator vane segment, of the three or more airfoil portions, is shifted from the pressure surface toward the suction surface in the circumferential direction of the turbine from the straight line parallel to the radial direction, and an amount of the shift monotonically increases from the predetermined spanwise position to the hub portion.

6. The stator vane segment according to claim 5, wherein when the spanwise position is indicated by a percentage of a dimensionless value obtained by dividing a height measured from the hub portion by a total height of each of the airfoil portions, the predetermined spanwise position is 10 to 50%.

7. The stator vane segment according to claim 5, wherein when the amount of the shift is indicated by a percentage of a dimensionless value obtained by division by a circumferential interval in the hub portion of each of the airfoil portions, the amount of the shift in the hub portion is 10 to 100%.

8. The stator vane segment according to claim 6, wherein when the amount of the shift is indicated by a percentage of a dimensionless value obtained by division by a circumferential interval in the hub portion of each of the airfoil portions, the amount of the shift in the hub portion is 10 to 100%.

* * * * *